United States Patent [19]

Frey

[11] 3,892,750
[45] July 1, 1975

[54] AZOMETHINE PIGMENTS AND PROCESSES FOR THEIR MANUFACTURE
[75] Inventor: Christoph Frey, Oberwil, Switzerland
[73] Assignee: Ciba-Geigy Corporation, Ardsley, N.Y.
[22] Filed: Aug. 3, 1973
[21] Appl. No.: 385,618

[30] Foreign Application Priority Data
Aug. 9, 1972 Switzerland................. 11763/72

[52] U.S. Cl.......... 260/270 Q; 260/37 N; 260/37 P; 260/270 K; 260/288 R; 260/289 R; 260/326.1; 8/42 A; 8/42 B; 8/42 C; 8/42 D; 8/42 R; 106/288 Q
[51] Int. Cl............................................. C07d 33/38
[58] Field of Search .............................. 260/270 R

[56] References Cited
UNITED STATES PATENTS
3,790,577  2/1974  Waring...................... 260/270 R Primary Examiner—Donald G. Daus
Assistant Examiner—Mark L. Berch
Attorney, Agent, or Firm—Vincent J. Cavalieri

[57] ABSTRACT

Azomethine pigments of the formula

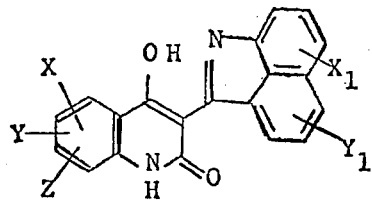

wherein the substituents X, Y, Z, $X_1$ and $Y_1$ denote H or halogen atoms or alkyl or alkoxy groups containing 1 – 6 C atoms, or wherein the substituents X and Y form a fused benzene ring, and metal complexes of these pigments, are useful for coloring plastics and lacquers in yellow to orange shades of good fastness properties.

7 Claims, No Drawings

NEW AZOMETHINE PIGMENTS AND PROCESSES FOR THEIR MANUFACTURE

It has been found that new valuable azomethines of the formula

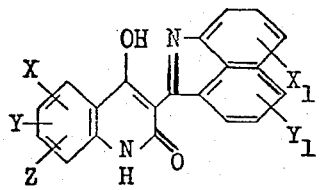

wherein the substituents, X, Y, Z, $X_1$ and $Y_1$ denote H or halogen atoms or alkyl or alkoxy groups containing 1–6 C atoms, or wherein the substituents X and Y form a fused benzene ring, as well as metal complexes of these pigments, are obtained when a 2,4-dihydroxyquinoline of the formula

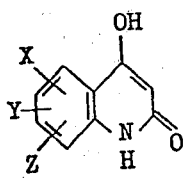

is condensed with a naphthostyril of the formula

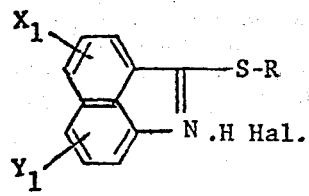

wherein R denotes an alkyl group and Hal denotes a halogen atom, and the resulting condensation product is metallised if desired.

Since the dyestuffs according to the invention are pigments, groups which confer solubility in water, especially acid groups which confer solubility in water, such as sulphonic acid groups or carboxylic acid groups, must of course not be present.

Particular interest attaches to azomethine metal complexes of the probable formula

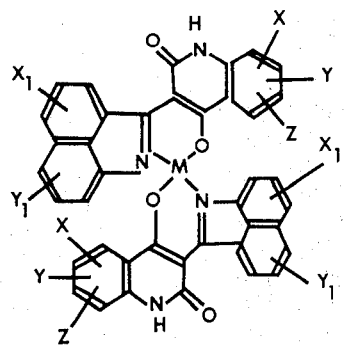

wherein M is a divalent metal atom, especially a nickel, copper or cobalt atom and X, Y, Z, $X_1$ and $Y_1$ have the indicated meaning.

The following known compounds may be mentioned as examples of 2,4-dihydroxyquinolines: 2,4-Dihydroxyquinoline, 6-chloro-2,4-dihydroxyquinoline, 8-chloro-2,4-dihydroxyquinoline, 6,7-dichloro-2,4-dihydroxyquinoline, 7,8-dichloro-2,4-dihydroxyquinoline, 6,7,8-trichloro-2,4-dihydroxyquinoline, 6-methyl-2,4-dihydroxyquinoline, 6-methyl-7-chloro-2,4-dihydroxyquinoline, 6-methyl-8-chloro-2,4-dihydroxyquinoline, and 6,7-dimethyl-2,4-dihydroxyquinoline.

The known 2-methylmercapto-benzo[c,d]-indole hydroiodide, and 2-methylmercapto-6-chloro- or -bromo-benzo-[c,d]-indole hydroiodide may be mentioned as naphthostyrils.

The condensation is appropriately carried out in an organic solvent at elevated temperature, preferably between 60° and the boiling point of the solvent used. As examples of solvents there may be mentioned: Alcohol, dioxane, pyridine, dimethylformamide, N-methylpyrrolidone, butyrolactone, glycol monomethyl ether, xylene, chlorobenzene, o-dichlorobenzene or mixtures thereof.

Since the dyestuffs obtained are sparingly soluble in the solvents mentioned, they can easily be isolated by filtration. Any impurities can be removed by elution.

For conversion into the metal complexes, the bisazomethines obtained are treated with agents which donate divalent metals, for example with salts of zinc, nickel or cadmium, but especially of copper and of cobalt, which give products which are particularly fast to weathering. Preferably, the formates, acetates or stearates of these metals are used. The metallisation is appropriately carried out in one of the abovementioned solvents or in a mixture of the abovementioned solvents.

The new dyestuffs are valuable pigments which can be used, in a finely divided form, for pigmenting high molecular organic material, for example cellulose ethers and cellulose esters, such as ethylcellulose, nitrocellulose, cellulose acetate, cellulose butyrate, natural resins or synthetic resins, such as polymerisation resins or condensation resins, for example aminoplasts, especially urea-formaldehyde resins and melamine-formaldehyde resins, alkyd resins, phenoplasts, polycarbonates, polyolefines, such as polystyrene, polyvinyl chloride, polyethylene, polypropylene, polyacrylonitrile and polyacrylic acid esters, polyamides, polyurethanes or polyesters, rubber, casein, silicones and silicone resins, individually or as mixtures.

It is immaterial whether the high molecular compounds mentioned are in the form of plastic masses or melts or in the form of spinning solutions, lacquers, paints or printing inks. Depending on the end use the new pigments are advantageously used as toners or in the form of preparations.

In the examples which follow the parts, unless otherwise stated, denote parts by weight and the percentages denote percentages by weight.

EXAMPLE 1

16 parts of 2,4-dihydroxyquinoline are added to a solution of 33 parts of 2-methyl-thiobenz-(c,d)-indole hydroiodide of the formula

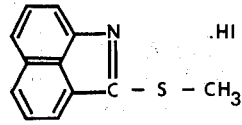

in 150 parts of pyridine and the mixture is warmed to 100°–105°C whilst stirring and kept at this temperature for 2 hours. After cooling, the precipitate is filtered off, rinsed with methanol and water and dried in vacuo at 80°–100°C. An orange-yellow crystal powder of the formula

is obtained.

EXAMPLE 2

For the purpose of complex formation, 6.25 parts of the substance obtained in Example 1, in 100 parts of dimethylformamide, and with the addition of 6.9 parts of cobalt stearate, are heated to 150°C for 16 hours, whilst stirring. The precipitate which separates out is filtered off hot and is washed with hot o-dichlorobenzene, cold methanol and water. A yellow pigment powder is obtained which when milled in a finely divided form into polyvinyl chloride yields a yellow sheet which has good fastness to light. A lacquer film pigmented with the pigment shows good fastness to light and to weathering.

If the 2,4-dihydroxyquinoline derivative of column I in the table which follows is condensed according to Example 1 with 2-methyl-thiobenz-(c,d)-indole hydroiodide and the complex with the metal salt indicated in column II is formed in accordance with Example 2, a pigment dyestuff of the shade shown in column III is obtained, which when milled into polyvinyl chloride or painted out in a lacquer has good fastness to light and to weathering.

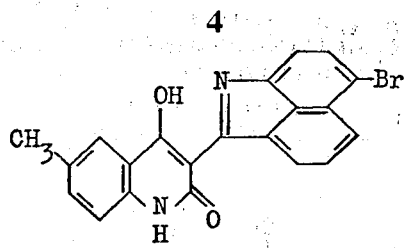

is obtained.

EXAMPLE 20

For the purpose of complex formation, 4.05 parts of the product obtained in Example 19, in 100 parts of diethylene glycol monoethyl ether, are heated with 0.97 part of nickel acetate to 145°–150°C whilst stirring and kept at this temperature for 16 hours. The precipitate which separates out is filtered off whilst still hot and is washed with hot o-dichlorobenzene, cold methanol and water. An orange pigment powder is obtained which when reduced to a finely divided state and milled into polyvinyl chloride yields an orange sheet which shows good fastness to light. A lacquer film pigmented with this pigment has good fastness to light and to weathering.

If instead of nickel acetate 1.37 parts of cobalt acetate.$4H_2O$ or copper acetate.$H_2O$ are used and the procedure of the above example is followed, orange pigment powders which have the same properties are obtained.

EXAMPLE 21

65 parts of stabilised polyvinyl chloride, 35 parts of dioctyl phthalate and 0.2 part of the dyestuff obtained according to Example 9 are stirred together and then milled on a two-roll calender for 7 minutes at 140°C. A sheet of reddish-tinged yellow colour, having very good fastness to light, is obtained.

Table

| Example | I | II | III |
|---|---|---|---|
| 3 | Dihydroxyquinoline | Cu stearate | Reddish-tinged yellow |
| 4 | Dihydroxyquinoline | Ni stearate | Yellow |
| 5 | 6-Methyl-dihydroxyquinoline | Ni stearate | Yellow-orange |
| 6 | 6-Methyl-dihydroxyquinoline | Cu acetate | Orange |
| 7 | 6-Methyl-dihydroxyquinoline | Co stearate | Yellow-orange |
| 8 | 6-Chloro-dihydroxyquinoline | Ni stearate | Yellow-orange |
| 9 | 6-Chloro-dihydroxyquinoline | Cu acetate | Yellow-brown |
| 10 | 6-Chloro-dihydroxyquinoline | Co stearate | Yellow-brown |
| 11 | 8-Chloro-dihydroxyquinoline | Ni stearate | Orange |
| 12 | 8-Chloro-dihydroxyquinoline | Co stearate | Orange |
| 13 | 6,7-Dichloro-dihydroxyquinoline | Cu acetate | Yellow-brown |
| 14 | 6,7-Dichloro-dihydroxyquinoline | Co acetate | Yellow-brown |
| 15 | 7,8-Dichloro-dihydroxyquinoline | Ni acetate | Orange |
| 16 | 7,8-Dichloro-dihydroxyquinoline | Cu acetate | Reddish-tinged yellow |
| 17 | 6,7,8-Trichloro-dihydroxyquinoline | Ni stearate | Yellow-orange |
| 18 | 6,7,8-Trichloro-dihydroxyquinoline | Cu stearate | Brownish-tinged yellow |

EXAMPLE 19

18 parts of 6-methyl-2,4-dihydroxyquinoline and 44 parts of 2-methylmercapto-6-bromo-benz[c,d]-indolehydroiodide of the formula

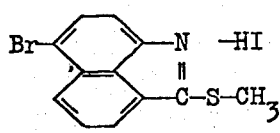

are warmed to 100°–105°C in 250 parts of pyridine and kept at this temperature for 2 hours, whilst stirring. After cooling, the precipitate is filtered off, washed with methanol and water and then dried in vacuo at 80°–100°C. A brown crystal powder of the formula

EXAMPLE 22

10 g of titanium dioxide and 2 g of the pigment manufactured according to Example 2 are ground with 88 g of a mixture of 26.4 g of coconut alkyd resin, 24.0 g of melamine-formaldehyde resin (50 percent solids content), 8.8 g of ethylene glycol monomethyl ether and 28.8 g of xylene for 48 hours in a ball mill.

If this lacquer is sprayed onto an aluminium foil, pre-dried for 30 minutes at room temperature and then stoved for 30 minutes at 120°C, a yellow lacquering is obtained, which has good colour strength and is distinguished by very good fastness to light and to weathering.

What we claim is:

1. An azomethine pigment metal complex of the formula

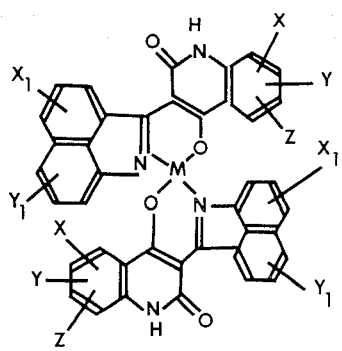

wherein M is nickel, copper, cobalt, zinc, or cadmium; and X, Y, Z, $X_1$ and $Y_1$ is hydrogen, halogen or alkyl of 1 to 6 carbon atoms, with the proviso that x, y and z are not simultaneously tertiary alkyl.

2. Metal complex according to claim 1, wherein M denotes a nickel, copper or cobalt atom.

3. The compound of the formula

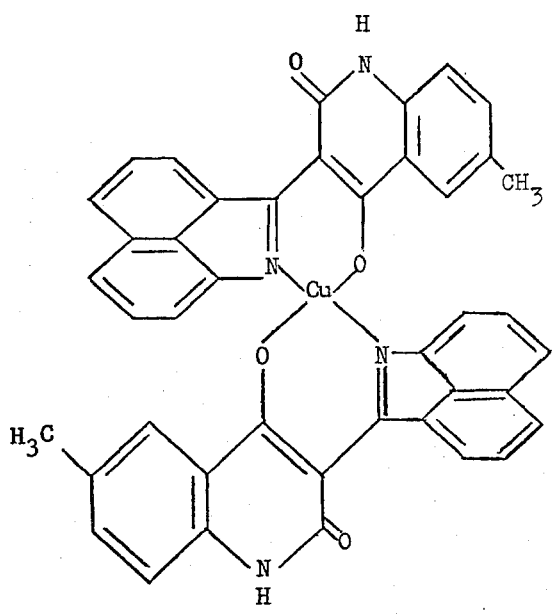

4. The compound of the formula

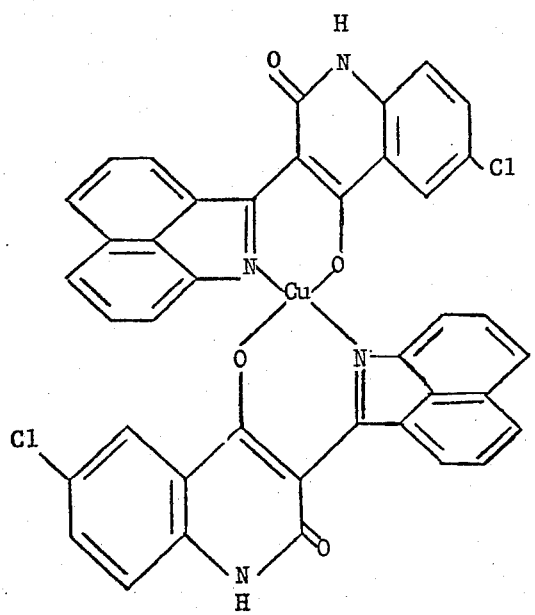

5. The compound of the formula

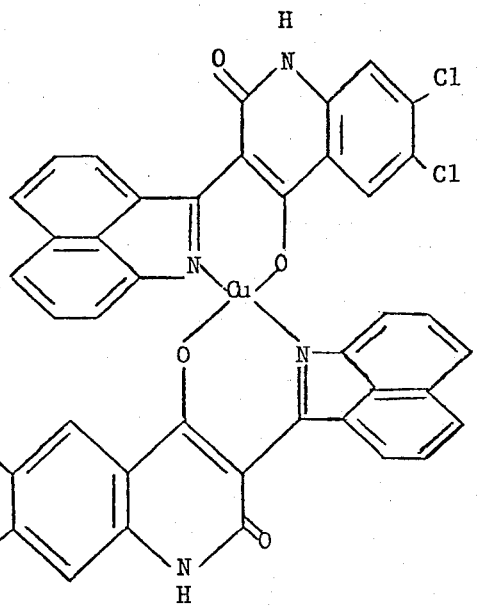

6. The 1:2-cobalt-complex of the dyestuff of the formula

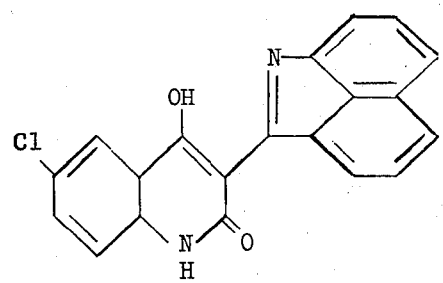

7. The 1:2-cobalt-complex of the dyes of the formula

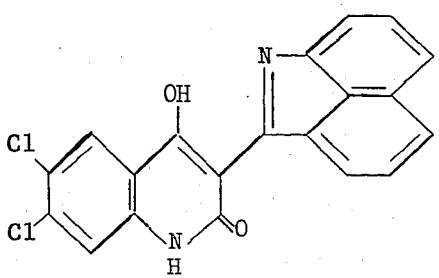

* * * * *